United States Patent Office 3,241,612
Patented Mar. 22, 1966

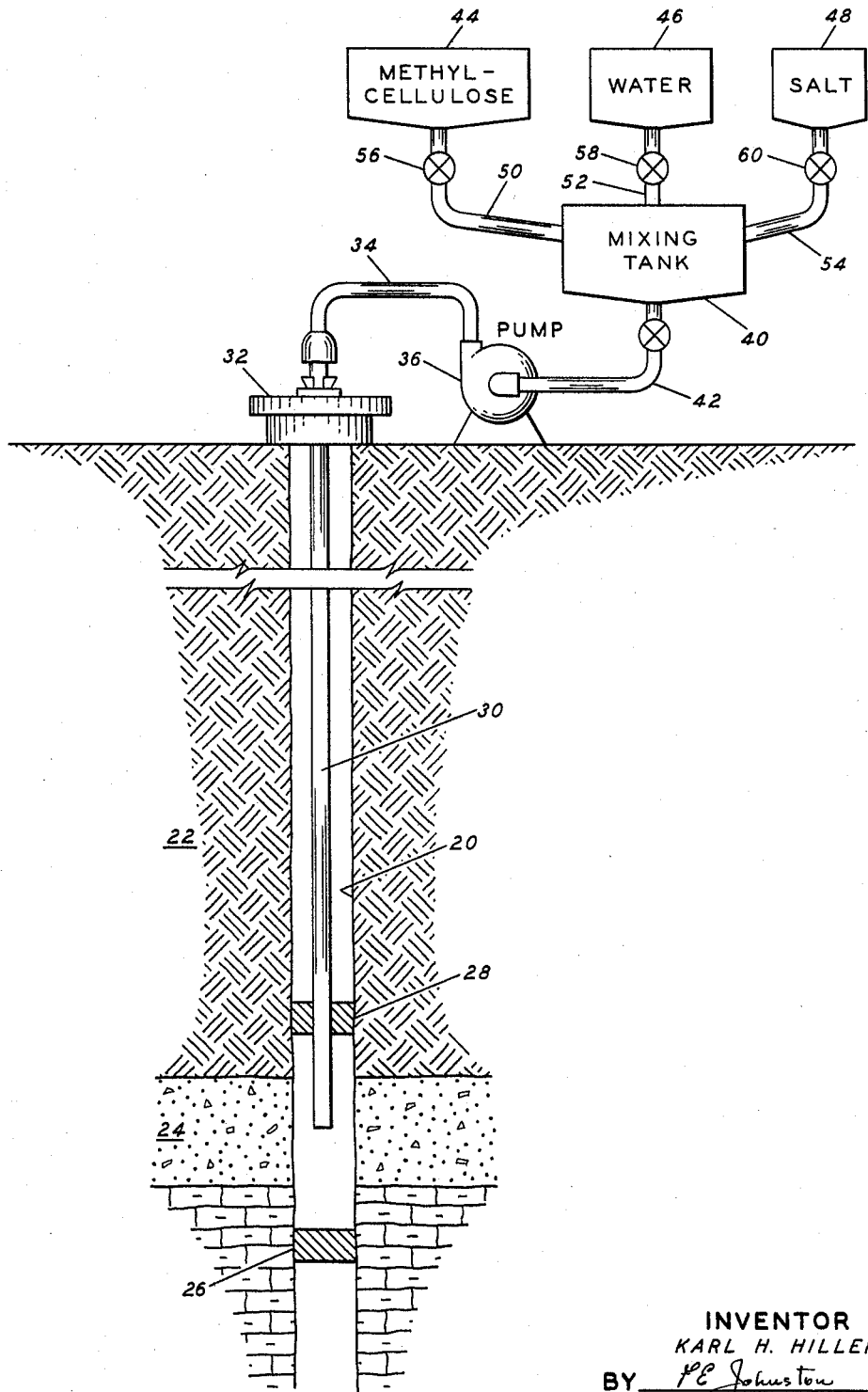

3,241,612
METHOD OF PLUGGING POROUS FORMATIONS
Karl H. Hiller, Laguna Beach, Calif., assignor to Chevron Research Company, a corporation of Delaware
Filed June 29, 1962, Ser. No. 206,205
3 Claims. (Cl. 166—25)

This invention relates to plugging formations penetrated by a borehole to prevent undesirable fluid flow either from or into said borehole.

When drilling a well, formations are sometimes penetrated which flow large volumes of an undesirable liquid such as, for example, salt water into the borehole. Conversely, some formations are too porous to be sealed by the circulating drilling mud and "lost circulation" of the drilling mud occurs when the mud flows into the porous formation. Preventing undesirable fluid flow either into or from a borehole is known in the well drilling art as formation plugging. It is within the skill of the drilling art to locate a formation which is causing undesirable fluid flow.

In the past there have been many methods of plugging a porous formation. Included among these are various methods of circulating a physical agent, such as chicken feathers, with the drilling mud to aid the mud in sealing the formation, forcing cement into the formation, and injecting into the borehole chemical substances which solidify when contacted with water in the formation. These are only a few examples of the prior art methods. As the large number of methods indicates, no completely satisfactory solution has been found to solve the problem.

Briefly, the present invention provides for plugging a porous formation to prevent undesirable fluid flow in well drilling by injecting through the borehole and into the porous formation a water solution of methylcellulose. The water solution is forced into the formation and held there under pressure until the solution gels. It is a particular property of water solutions of methylcellulose to gel as the temperature increases. A low concentration water solution of a water-soluble methylcelluose forms a stiff gel when the solution is heated to above a determinable temperature. Since underground formations are generally at an increased temperature, the method of this invention includes injecting a water solution of methylcellulose into a porous formation and holding pressure on the solution until the heat of the formation causes the solution to gel and plug the formation. It has been discovered that particular types of methylcellulose are effective in plugging a porous formation. The effective use of the solution for plugging a formation depends on the concentration of the methylcellulose in the solution.

It is a particular object of this invention to provide a method of plugging a porous formation by injecting into said formation a water solution of methylcellulose, holding pressure on said solution to cause the solution to be heated by the formation to a temperature which causes the solution to gel to plug the formation and then releasing the pressure on the solution. Further objects and advantages of the present invention will become apparent from the following detailed discussion.

Further objects and advantages of this invention will become apparent from the following detailed description read in light of the drawing which is part of this specification.

Referring specifically now to the drawing, a well 20 penetrating an earth formation 22 is shown. The well 20 has penetrated a streak or zone 24 of high permeability which might, for example, be flowing water into the well or causing drilling fluid to be lost from the well.

The well is provided with packing means 26 and 28 to isolate the porous formation 24. A tubing string 30 provides fluid communication from the surface through rotary table 32 to the porous formation 24. Suitable surface tubing 34 connects the tubing string 30 with the discharge of a suitable pump 36.

A mixing tank 40 is connected to the intake of the pump 36 by tubing 42. The mixing tank 40 receives the materials for preparing a plugging solution in accordance with the present invention from means 44 defining a source of methylcellulose, means 46 defining a source of water, and means 48 defining a source of a selected salt. Suitable tubing 50, 52, and 54 having adjustable valves 56, 58 and 60, respectively, provides for the flow of the components to the tank 40.

It has been discovered that an aqueous solution of methylcellulose which is injected into a porous formation and caused to gel provides an excellent means for plugging the formation. Methylcellulose in water solution has the property of forming a stiff gel as the temperature increases above a determinable temperature. The temperature of the formation to be plugged must be higher than the gelation temperature of the methylcellulose solution. In other words the gelation temperature of the aqueous plugging solution must be lower than the formation temperature. Since the gelation temperature of the methylcellulose solutions can be adjusted by various means it is only necessary to know the temperature of the formation and if necessary to adjust the gelation temperature of the solution to a value below the formation temperature. Many methods of determining the temperature of a formation are well known in the art. For example, a thermocouple may be lowered into a well adjacent a formation. After the thermocouple comes to equilibrium the temperature of the formation is read from the thermocouple.

Methylcellulose is an ether of cellulose formed by the interaction of the methyl chloride with cellulose which has been reacted with a strong base. The methylation of cellulose has been long known in the art. Preparation of methylcellulose is possible by a variety of well-known methods. Methylcellulose is described and methods of making methylcellulose are disclosed in a survey article in "Colloid Chemistry," J. Alexander, vol. VI, p. 926, Reinhold, 1946.

The properties of methylcellulose depend on the degree of substitution of the methoxy groups on the anhydroglucose rings of cellulose. The degree of substitution is highly reflected in the solubility properties of the particular type of methylcellulose. Therefore the present invention provides for utilizing a methylcellulose having a degree of substitution within a limited range. An initial requirement of the methylcellulose for the present invention is water solubility. Solubility is observed in cold water only when the degree of substitution lies between 1.3 and 2.6. The property of gelling as the temperature increases is found only in methylcellulose with a degree of substitution of greater than 1.4.

A preferred methylcellulose for use in the present invention comprises a methylcellulose which contains about 26 to 33 percent of methoxy groups in the molecule. This percentage corresponds to a degree of substitution of from about 1.6 to 2.0. This means that out of three positions where substitution of a methoxy group is possible on the anhydroglucose rings of cellulose, on the average 1.6 to 2.0 are occupied by the methoxy groups. There are other cellulose ethers which have various ratios of propylene glycol ether substitution to methoxy substitution. However, these materials gel at a much higher temperature than the preferred materials and are not as effective as a plugging agent.

It has been found that the effectiveness of the methylcellulose in plugging a porous formation is not only a function of the degree of substitution of the methoxy groups but is also a function of the viscosity in solution. The viscosity type of a methylcellulose is defined by the viscosity of a 2 percent (by weight) aqueous solution as measured at 20° C. The preferred methylcellulose of the present invention should be selected from the group of methylcellulose compounds having a degree of substitution of methoxy groups of between 1.6 and 2.0 methoxy groups and a viscosity in a 2 percent water solution of between 100 centipoise and 8000 centipoise. The 100 to 8000 centipoise range specifies the viscosity type of the preferred methylcellulose and not the plugging solution viscosity. The aqueous plugging solution may contain a concentration of as little as about 0.5 percent by weight and as much as 3.0 percent by weight of the methylcellulose having a degree of substitution of between 1.6 and 2.0 and having a viscosity of between about 100 centipoise and 8000 centipoise in a 2 percent aqueous solution. Solutions of this type of methylcellulose of higher concentration than about 3 percent are too viscous even below the gelation temperature to be useful. Solutions of methylcellulose of a concentration below about 0.5 percent are found to form a gel of insufficient strength to adequately plug a formation.

In one aspect then the present invention provides for plugging a porous formation penetrated by a borehole comprising preparing a water plugging solution of methylcellulose, said methylcellulose having a degree of substitution of methoxy groups of from about 1.6 to 2.0 and a viscosity between about 100 centipoise and 8000 centipoise in a 2 percent by weight aqueous solution, said water plugging solution having a concentration of said methylcellulose of between about 0.5 percent and 3.0 percent by weight, injecting said water plugging solution into a porous formation and causing said solution to gel in said formation.

To test the effectiveness of solutions of methylcellulose as a plugging agent a series of demonstrations were performed. A column 1.5 feet long with an outside diameter of 1.2 inches was filled with sand having mesh size of between 100 and 270. A thermocouple was placed inside a well in the center of the pack. The bottom of the sand was held in place by a fine wire screen. An electric heating mantle surrounded the column. The heat input was controlled by means of a Variac. At the beginning of a demonstration the water flow rate through the column was measured under a pressure head of 15 p.s.i., then the sand pack was heated to the desired temperature. After a constant temperature was established a slug of 50 ml. of the methylcellulose solution was forced into the sand pack from the top and followed again by water. After a few minutes the flow rate through the column was measured. The measurements of the flow rate continued over an extended period until an equilibrium flow rate was reached. Various types of methylcellulose were used in the different demonstrations. The methylcellulose was made commercially by The Dow Chemical Company under the trade name "Methocel." Two grades of "Methocel" were included in the experiments. Both "Methocel" MC and "Methocel" HG grades were used. The "Methocel" MC compounds contain 26 to 33 percent of methoxy groups in the molecule corresponding to a degree of substitution of 1.6 to 2.0. This means that where substitution is possible on the anhydroglucose rings of cellulose, on the average of 1.6 to 2.0 are occupied by methoxy groups. "Methocel" is prepared by the methylation of alkali cellulose. Substitution for some of the methoxy groups of other substituents may give water-soluble products that gel at higher temperatures or which do not gel at all below the boiling point of water and which are not preferred in the present invention. The "Methocel" HG compounds have various ratios of propylene glycol ether substitutions to methoxy substitutions. The "Methocel" HG compounds gel at a higher temperature than the MC compounds and they are not as effective as the MC compounds for plugging formations. The numeral following the letter designation of the compounds gives the viscosity of the compound in centipoise of a 2 percent by weight aqueous solution. That is, "Methocel" MC 400 refers to methylcellulose having a degree of substitution of 1.6 to 2.0 and a viscosity of 400 centipoise in a 2 percent by weight aqueous solution.

*Example 1*

The flow rate of a column of the above specifications was 188 ml./min. before treatment. The column was heated to 167° F. An aqueous plugging solution was prepared by mixing 2.0 percent by weight solution of "Methocel" MC 100 in water. This solution which has a gelation temperature of about 130 to 140° F. was injected into the column and caused to come to thermal equilibrium and a stiff gel was formed. The flow rate through the column after treatment decreased rapidly and leveled off at 29 ml./min.

*Example 2*

The flow rate of a column of the above specifications was 236 ml./min. before treatment. The column was heated to 167° F. A plugging solution was prepared by mixing a 1.5 percent by weight aqueous solution of "Methocel" MC 400. This solution which has a gelation temperature of about 130 to 140° F. was injected into the column and caused to come to thermal equilibrium and a stiff gel was formed. The flow rate through the column after treatment decreased rapidly and finally reached 0.03 ml./min. This figure was arrived at by averaging the flow through the column over the period of a day.

*Example 3*

The flow rate of a column of the above specifications was 223 ml./min. before treatment. The column was heated to 167° F. A plugging solution was prepared by mixing a 2.0 percent by weight aqueous solution of "Methocel" MC 400. This solution which has a gelation temperature of about 130 to 140° F. was injected into the column and caused to come to thermal equilibrium and a stiff gel was formed. The flow rate through the column after treatment decreased rapidly to 0.05 ml./min. This figure was arrived at by averaging the flow through the column over the period of a day.

*Example 4*

The flow rate of a column of the above specifications was 208 ml./min. before treatment. The column was heated to 167° F. A plugging solution was prepared by mixing a 1.0 percent by weight aqueous solution of "Methocel" MC 4000. This solution which has a gelation temperature of about 130 to 140° F. was injected into the column and caused to come to thermal equilibrium and a stiff gel was formed. The flow rate decreased rapidly after treatment to 1.2 ml./min. This figure was arrived at by averaging the flow through the column for a day.

*Example 5*

The flow rate of a column of the above specifications was 236 ml./min. before treatment. The column was heated to 167° F. A plugging solution was prepared by mixing a 1.5 percent by weight aqueous solution of "Methocel" MC 4000. This solution which has a gelation temperature of about 130 to 140° F. was injected into the column and caused to come to thermal equilibrium and a stiff gel was formed. The flow rate through the column decreased rapidly after treatment to 0.1 ml./min. This figure was arrived at by averaging the flow during a day through the column.

Example 6

The flow rate of a column of the above specifications was 256 ml./min. before treatment. The column was heated to 167° F. A plugging solution was prepared by mixing an 0.5 percent by weight aqueous solution of "Methocel" MC 8000. This solution which has a gelation temperature of about 130 to 140° F. was injected into the column and caused to come to thermal equilibrium and a stiff gel was formed. The flow rate after treatment decreased to 80 ml./min.

Example 7

The flow rate of a column of the above specifications was 260 ml./min. before treatment. The column was heated to 167° F. A plugging solution was prepared by mixing a 1.0 percent by weight aqueous solution of "Methocel" 65HG 4000. This solution which has a gelation temperature of about 145 to 155° F. was injected into the column and caused to come to thermal equilibrium and a stiff gel was formed. The flow rate through the column after treatment was 156 ml./min.

Example 8

The flow rate of a column of the above specifications was 240 ml./min. before treatment. The column was heated to 167° F. A plugging solution was prepared by mixing a 1.0 percent by weight aqueous solution of "Methocel" 70HG 4000. This solution which has a gelation temperature of about 155 to 165° F. was injected into the column and caused to come to thermal equilibrium and a stiff gel was formed. The flow rate through the column after treatment was 104 ml./min.

Example 9

The flow rate of a column of the above specifications was 254 ml./min. before treatment. The column was heated to 167° F. A plugging solution was prepared by mixing a 1.0 percent by weight aqueous solution of "Methocel" 60HG 4000. This solution which has a gelation temperature of about 135 to 145° F. was injected into the column and caused to come to thermal equilibrium and a stiff gel was formed. The flow rate through the column after treatment was 135 ml./min.

In Examples 1–6 above, the methylcellulose used had a degree of substitution of between 1.6 and 2.0 methoxy groups. The viscosity type of the methylcellulose ranged in value between 100 centipoise and 8000 centipoise in a 2 percent by weight water solution. Particularly excellent plugging resulted with the 1 to 2 percent by weight aqueous plugging solutions of methylcellulose having a degree of substitution of between 1.6 and 2.0 methoxy groups and a viscosity between 400 and 4000 centipoise in 2.0 percent by weight aqueous solution. Examples 7, 8, and 9 show about a 50 percent reduction in flow rate compared to almost complete shut-off in flow in Examples 2, 3, 4, and 5. The materials used in Examples 7, 8, and 9 had various ratios of propylene glycol ether substitutions to methoxy substitutions. The materials used in Examples 2, 3, 4, and 5 had only methoxy group substitution.

Methylcellulose having a degree of substitution of 1.6 to 2.0 is soluble in water and forms a stiff gel when the solution is heated to a temperature of about 55 to 60° C. Below this temperature the methylcellulose forms a clear liquid solution in water. The viscosity of the solution depends upon the concentration and upon the molecular weight of the methylcellulose. The methylcellulose is nonionic and is therefore compatible with electrolytes in solution to a considerable extent. Therefore any water which is suitable for making drilling mud is suitable to mix with methylcellulose.

The gelation temperature of an aqueous solution of methylcellulose may be adjusted by the addition of salts to the solution. The effectiveness of salts in lowering the gelation temperature of the solution seems to be independent of the nature of the cation and increases in this order: thiocyanate<iodide<nitrate<bromide<chloride<acetate<tartrate<sulfate. The first two salts mentioned above actually raise the gelation temperature of methylcellulose. The latter salts can lower the gelation temperature of a given solution as much as 20° C.

In practicing the method of the present invention a clear aqueous solution of methylcellulose is prepared at the well head. In the preferred embodiment of the invention the solution is prepared from methylcellulose having a degree of substitution of 1.6 to 2.0 and a viscosity in 2 percent by weight aqueous solution of between 400 to 4000 centipoise. The aqueous plugging solution should contain 1 to 2 percent by weight of the methylcellulose. Any water ordinarily used for preparing drilling mud is usable. Special precautions must be taken to completely dissolve the methylcellulose in the water. One method of preparing the solution is adding the required quantity of dry powdered methylcellulose to one-fourth of the total amount of water required. This water should be hot (80 to 90° C.) and the methylcellulose should be dispersed in it thoroughly. The remainder of the water is added cold, preferably mixed with ice.

The formation to be plugged is isolated from the rest of the borehole by means of packers. The prepared solution of methylcellulose is pumped into the borehole to the isolated formation. Pressure is then applied to the solution by means of pumps and the solution is forced into the porous formation. The methylcellulose solution must be forced into the formation a substantial distance in from the borehole. This can be done by filling the drilling pipe behind the methylcellulose solution with a spacer fluid, e.g., water, and applying pressure to the solution. When a desirable amount of solution has been forced into the formation it is allowed to remain under pressure. When the formation has warmed the solution to a temperature at which a gel will form, gelation takes place. When the gel has had time to form, the pressure on the formation is released and drilling resumed. The formation is plugged permanently because the gelled methylcellulose does not support the growth of microorganisms and is chemically quite stable. If desirable, preservatives can be added to prolong the life of the gel.

The methylcellulose solution must be injected into the formation in a manner to prevent premature gelation of the solution in the drill pipe or in the borehole. For example, the solution can be introduced at the well head very cold, just above the freezing point so that it does not reach the gelation temperature until it has been squeezed into the formation. Gelation may also be retarded by strong agitation of the plugging solution during injection into the borehole. This agitation is accomplished by maintaining turbulent flow of the solution in the drill pipe.

As is apparent from the above detailed description and examples the present invention provides a novel method of plugging a porous formation. Although only a few embodiments of the invention have been described, the scope of the invention is intended to be limited only by the appended claims.

I claim:

1. A method of plugging a porous formation penetrated by a borehole comprising determining the temperature of said formation, preparing an aqueous plugging solution of methylcellulose, said methylcellulose having a degree of substitution of between 1.6 to 2.0 methoxy groups and a viscosity of between about 100 centipoise and 8000 centipoise in a 2.0 percent by weight water solution, said aqueous plugging solution containing between about 0.5 and 3 percent by weight of said methylcellulose, adjusting the gelation temperature of said solution to a value less than said determined formation temperature by adding to said solution a water-soluble salt selected from the group consisting of nitrate, bromide, chloride, acetate, tartrate and sulfate, injecting said solution through said borehole into said porous formation, applying pressure to said solution to force it into said formation, and maintaining the pressure on said solution for a predetermined time to allow said solution to be heated by said formation whereby the solution gels.

2. The method of claim 1 where said solution is cooled to just above the freezing temperature prior to injecting said solution into said formation.

3. The method of claim 1 where said solution is agitated while being injected through said borehole into said formation.

References Cited by the Examiner

UNITED STATES PATENTS

| | | | |
|---|---|---|---|
| 2,543,868 | 3/1951 | Prokop | 166—32 |
| 2,549,507 | 4/1951 | Morgan | 166—31 |
| 2,805,720 | 9/1957 | Wiegand | 166—32 |

CHARLES E. O'CONNELL, *Primary Examiner.*

BENJAMIN BENDETT, *Examiner.*

C. H. GOLD, T. A. ZALENSKI, *Assistant Examiners.*